United States Patent
Thornley et al.

(10) Patent No.: US 6,826,752 B1
(45) Date of Patent: Nov. 30, 2004

(54) PROGRAMMING SYSTEM AND THREAD SYNCHRONIZATION MECHANISMS FOR THE DEVELOPMENT OF SELECTIVELY SEQUENTIAL AND MULTITHREADED COMPUTER PROGRAMS

(75) Inventors: John Thornley, Charlottesville, VA (US); K. Mani Chandy, La Cañada, CA (US); Hiroshi Ishii, Stanford, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 09/461,160

(22) Filed: Dec. 14, 1999

Related U.S. Application Data

(60) Provisional application No. 60/112,817, filed on Dec. 17, 1998.

(51) Int. Cl.[7] .............................................. G06F 9/46
(52) U.S. Cl. ..................... 718/100; 718/102; 718/106; 718/107; 717/100; 717/114
(58) Field of Search ............................... 718/102, 106; 717/100, 114, 130, 131, 162; 709/100, 107, 316

(56) References Cited

U.S. PATENT DOCUMENTS

| | | | |
|---|---|---|---|
| 5,179,702 A | | 1/1993 | Spix et al. |
| 5,197,130 A | | 3/1993 | Chen et al. |
| 5,551,034 A | | 8/1996 | Herz |
| 5,768,594 A | | 6/1998 | Blelloch et al. |
| 5,822,588 A | * | 10/1998 | Sterling et al. .............. 717/131 |
| 5,862,376 A | * | 1/1999 | Steele et al. ................. 709/107 |
| 5,928,334 A | * | 7/1999 | Mandyam et al. ........... 709/248 |
| 5,951,653 A | * | 9/1999 | Hill et al. ..................... 709/315 |
| 6,009,269 A | * | 12/1999 | Burrows et al. ............. 717/130 |
| 6,064,818 A | * | 5/2000 | Brown et al. ................ 717/159 |
| 6,067,604 A | * | 5/2000 | Ramachandran et al. ... 711/149 |
| 6,158,048 A | * | 12/2000 | Lueh et al. ................... 717/118 |
| 6,237,043 B1 | * | 5/2001 | Brown et al. ................ 709/316 |
| 6,286,130 B1 | * | 9/2001 | Poulsen et al. .............. 717/119 |
| 6,430,638 B1 | * | 8/2002 | Kessler et al. .............. 710/200 |
| 6,453,466 B1 | * | 9/2002 | Eidt ............................ 717/162 |
| 2002/0059358 A1 | * | 5/2002 | Kanamori .................... 709/107 |

* cited by examiner

Primary Examiner—Meng-Al T. An
Assistant Examiner—Lilian Vo
(74) Attorney, Agent, or Firm—Fish & Richardson P.C.

(57) ABSTRACT

A structured multithreaded programming system is described for integrated use with existing and new programming languages and systems. The structured multithreaded programming system enables programs to be developed which include both multithreaded and multithreadable code constructs. The multithreaded code constructs require explicitly concurrent execution. The multithreadable code constructs can be executed either sequentially or concurrently, at the selection of the programmer or computer user. When executed concurrently, the different threads of execution in a multithreaded program developed with this system can be synchronized using innovative synchronization objects. One type of synchronization object is a special type of counter, which can be constrained to be monotonically increasing in value. Another related type of synchronization object is a special type of flag, which can be constrained to have its value set monotonically.

6 Claims, 3 Drawing Sheets

PROGRAMMING SYSTEM AND THREAD SYNCHRONIZATION MECHANISMS FOR THE DEVELOPMENT OF SELECTIVELY SEQUENTIAL AND MULTITHREADED COMPUTER PROGRAMS

The present application claims priority under 35 U.S.C. 119(e) from provisional application No. 60/112,817 filed Dec. 17, 1998.

BACKGROUND

Many computer programs are computationally intensive, meaning that they require large amounts of computing power. As a consequence, these programs may execute more slowly than the computer user desires, even on the fastest computers. One way of increasing the execution speed of a computationally intensive computer program is to divide the program into multiple units, or loci, of concurrent execution. These units of execution are known as "threads". A program with multiple threads of execution is known as a "multithreaded program". A program with only a single thread of execution is known as a "sequential program". The threads that make up a multithreaded program may be executed concurrently on multiple computer processors, allowing many operations in the program to be carried out simultaneously, thereby speeding up program execution.

In a multithreaded program, the program or operating system must control the access of threads to data objects in the program, in order to the prevent the multiple threads from concurrently accessing the same data object in an undesirable manner. If multiple threads modify the same data object concurrently, or read and modify the same data object concurrently, the resulting state of the program is extremely difficult to determine. Developing a multithreaded program is significantly more difficult than developing a sequential program because of the problems of (1) expressing the division of a program into multiple threads and (2) structuring and controlling the access of those threads to data objects.

SUMMARY

The present application teaches a structured thread ("Sthread") system with thread synchronization and production mechanisms.

Another aspect produces multithreadable code. The multithreadable code can be annotated using information indicative of its multithreadability. The multithreadable code constructs are code constructs that can be executed in a multithreadable manner, or equivalently in a sequential manner. Multithreadable code constructs may be expressed by annotating sequential code constructs to indicate that their multithreaded execution is equivalent to sequential execution. The multithreadable code can be used along with multithreaded code. Specific instances of a multithreadable constructs: a multithreadable block, and a multithreadable for loop, and are disclosed.

The second aspect of the system is the integration of multithreadable code constructs with traditional explicitly multithreaded code constructs. Explicitly multithreaded code constructs must always be executed in a multithreaded manner. Examples of explicitly multithreaded code constructs include multithreaded block constructs, multithreaded for loop constructs, and library-based thread creation functions. Multithreadable code constructs and explicitly multithreaded code constructs may be intermingled within a program as required, with well-defined meaning.

According to a first aspect, a special counter called an "s-counter", is used as a thread synchronization mechanism.

Special "s-Flags" can also be used for thread synchronization, and flag synchronization is also described herein.

Yet another aspect is the implementation of the programming system within an existing compiler environment using a special pre-processing system.

The embodiments of the invention describe additional details, including the following:

The s-counter synchronizing the access of threads to shared data objects. The mechanisms use "monotonic" synchronization objects, with operations that can be constrained to only move the value of the object in one direction. Monotonic synchronization objects can be used to synchronize the access of threads to shared data objects in multithreadable code constructs in a manner that guarantees the equivalence of sequential and multithreaded execution. Specific instances of monotonic synchronization objects are disclosed, namely a form of counter called an "s-counter" and a form of flag called an "s-flag". The s-counter is a particularly powerful thread synchronization mechanism in many contexts, with its use in multithreadable code constructs being one example.

The application describes implementation of the multithreaded programming system within an existing program development and compilation environment using a special source-to-source preprocessing system and high-level thread library. This allows the system to be transparently and seamlessly integrated with existing programming systems such as Microsoft Visual Studio for the Microsoft Windows family of operating systems, the GNU program development tools for Linux and other versions of the Unix operating system, or on any version of the Java programming language, for example.

BRIEF DESCRIPTION OF THE DRAWINGS

These and other aspects will now be described in detail with respect to the accompanying drawings, wherein.

DETAILED DESCRIPTION

Figure 1:
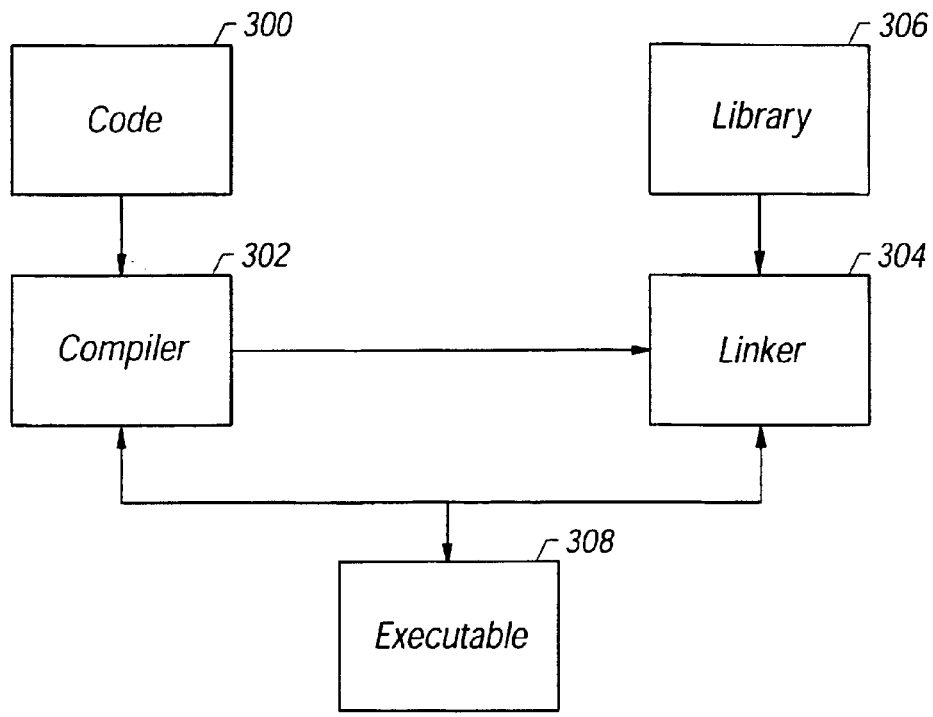
FIG. 1 is a process flowchart showing a prior art method for compiling multithreaded code.

FIG. 1 is a process flowchart showing a prior art method for compiling multithreaded code. Source code text 300 including multithreaded code constructs is processed by a conventional compiler 302. The compiler communicates with a linker 304 which links pre-existing routines from a library 306 with the output of the complier to create an executable module 308.

Existing operating systems, including the WIN32 API, often provide a general purpose thread library which may allow carrying out defined tasks like these For example, a first thread may be defined for operating the CD ROM, and another for the modem.

Windows NT WIN32 thread creation is unstructured. A thread is created by passing a function pointer and an argument pointer to a CREATETHREAD call. The new thread then executes the given function with the given argument.

There is no specific relationship between the created thread and the creating thread: the two threads are effectively asynchronous. One thread for example, can arbitrarily suspend, resume or terminate the execution of another thread.

This is not a problem for unrelated tasks like CD/modem tasks noted above. However, when two parts of a program are to be executed as threads, the synchronization operations are often complex and error prone. Unpredictable interactions among the multiple threads can induce problems including race conditions, and deadlock. Effectively, the user is left with the daunting task of using these thread libraries in a way that does not cause this problem.

The present application discloses a specific embodiment operating using the Windows NT™ system. It should be understood, however, that this system is portable across many platforms and that the same concept described herein can be used in those systems, including Linux, and any other operating system.

While a process has its own address space, a thread is often simply a program counter and stack pointer. A process may have many threads but all the threads share the same address space.

Figure 2:
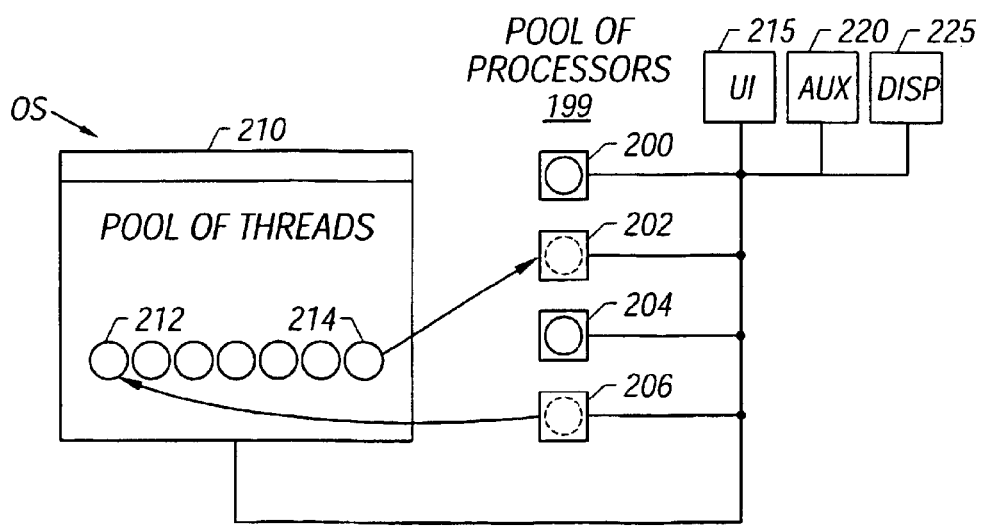
FIG. 2 shows a computer system and its thread allocation system.
Figure 3:
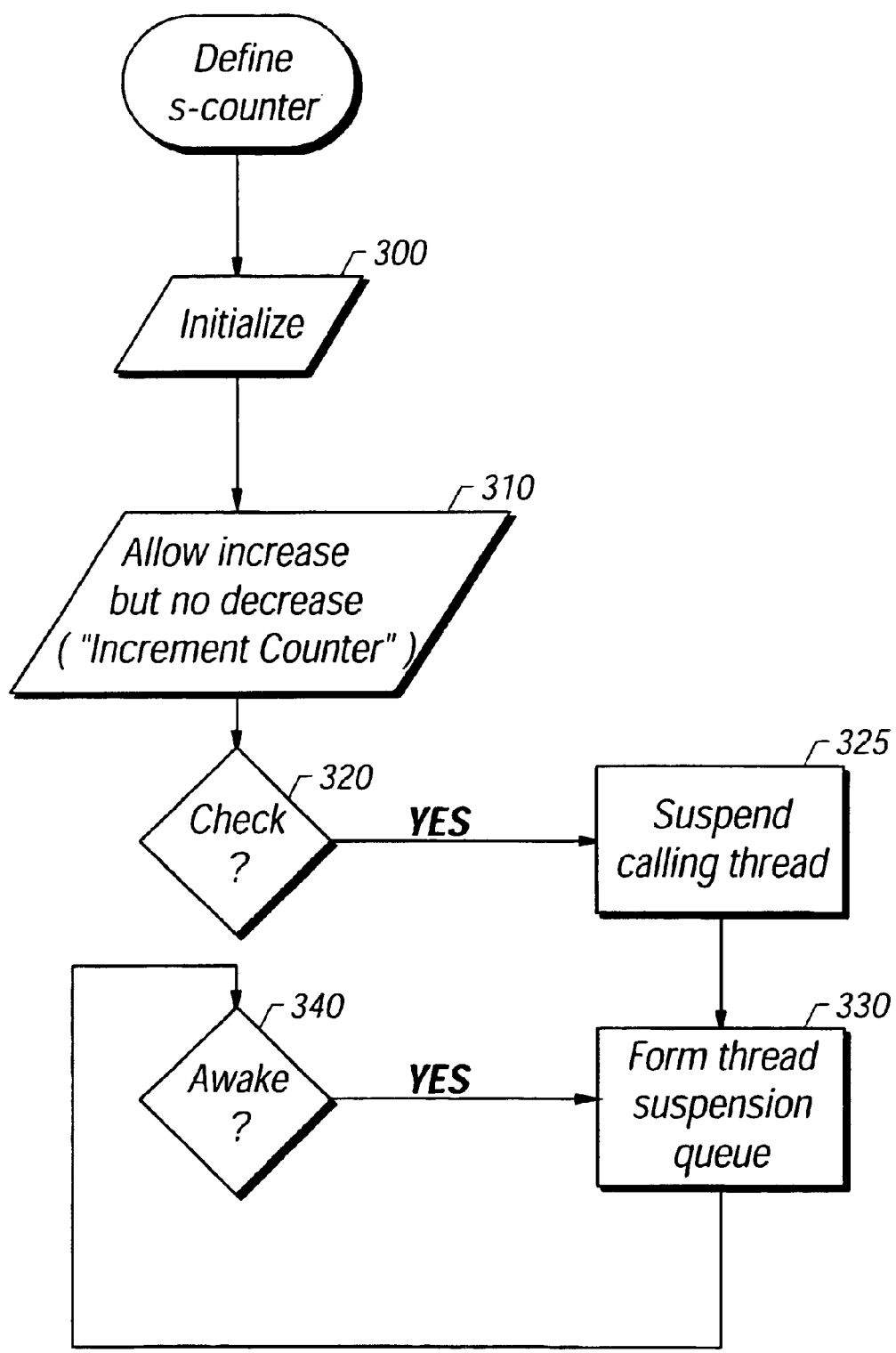
FIG. 3 shows a flowchart of defining an s-counter.

FIGS. 2 and 3 show this operation in a computer system. FIG. 2 shows a computer system, with four processors 200, 202, 204, 206. The processors can be in a multiple processor system as shown. The pool 199 of processors is associated with an operating system 210, a user interface 215, auxiliary hardware 220 (e.g. memory, chipsets, etc), a display 225 and other computer components.

The operating system 210 includes multiple threads 212, 214, and others. Each thread is resident on the stack within the heap. The threads are associated with processors, which execute the threads. FIG. 2 shows the pool of threads on the left and the pool of processors on the right. Each of the dynamically-created threads are peers. Of course there can be many more threads than processors. The operating system controls the threads to dynamically switch between the processors.

The present application defines an entirely new way of creating, synchronizing, and handling the synchronization among threads. The system uses a new way of compiling code based on multithread*able* code, either alone, or in conjunction with multithread*ed* code.

The operating system or programming language has a higher level system that uses special constructs called "equivalency annotations". A lower level function call based system is used with special objects. Those special objects can synchronize among the threads in a way that prevents the objects within the threads from having ambiguous states.

Many of these systems are based on the concept of equivalence annotations. Equivalence annotations can take many forms—pragmas, special keywords, special kinds of comments, special characters, textual modifications (such as boldfacing, underlining, or italics), and others. They could be part of the program text, or in a separate file i.e., an extra file that contains nothing but the annotations. The pragma can have meaning to a compiler. Pragmas often form a specified syntax, but usually convey nonessential information that is intended to help the compiler to optimize the program.

The present embodiment uses these pragmas as special equivalence annotations. Pragmas are convenient for annotations since many programming language already provide pragmas for other purposes. While a pragma is described as being used as the preferred annotation of the present application, the program can certainly be annotated in other manners. For example, Java does not support pragmas, so a special kind of comment line could be used. The equivalence annotations described throughout this specification should be understood to be interpretable in this way.

The MULTITHREADABLE equivalence annotation can be a pragma when embodied in the C programming language. This indicates that a block or loop can be executed in a multithreaded manner. This means that there is no timing dependent nondeterminacy, and the system can execute the instructions into a multithreaded system.

The MULTITHREADED equivalence annotation means that a block or loop must be executed in a multithreaded manner. The multithreaded execution need not be equivalent to sequential execution. Lock synchronization can be used to introduce nondeterminacy if desired.

The equivalence annotation becomes part of the operating system. Special, monotonically increasing and otherwise constrained S-COUNTERS, and similarly constrained S-FLAGS are operated to synchronize the access of threads to shared memory in order to prevent unwanted interference.

A special SYNCHRONIZATION COUNTER, or S-COUNTER is defined as an object with three basic attributes. The S-COUNTER has a non-negative integer value. The object only allows an INCREMENT operation and a CHECK operation. An initial value of the S-COUNTER object is set to zero. An INCREMENT function automatically increases the value of the counter by a specified amount. The CHECK operation suspends the calling thread until the value of the counter becomes greater than or equal to a specified level.

The multi-threaded programming system has a higher level notation includes annotation objects in the program code. Using the example of the c language, this can be described as "multi-threaded c".

A lower level structured thread library is described as "Sthreads". The special annotation objects are transformed into special Sthread calls by the Sthreads annotation objects pre-processor.

The multithreaded model uses the thread synchronization/annotation objects disclosed above to synchronize among the threads.

Threads can be created in different ways. A first thread creation construct is the multithreaded block. This is indicated by the MULTITHREADED keyword placed immediately before an ordinary C block:

```
MULTITHREADED {
    statement
    ...
    statement
}
```

This notation specifies that the statements of the block should be executed as asynchronous threads. This is a conventional way of referring to these threads. For example, the operating system could create threads to read from CD, and threads to read from tape. The threads are executed and proceed concurrently. They all share the same address space as the parent program. Execution does not continue past the multithreaded block until all the threads have individually terminated. It is typically illegal for the program to contain any kind of jump between the individual statements of the block, from inside the block to outside the block, or from outside the block to inside the block.

A second thread creation construct is the multithreaded for-loop, indicated by the MULTITHREADED keyword placed immediately before an ordinary for-loop:

MULTITHREADED
  FOR (I=expression; I comparison expression; I=I+ expression)
    statement This notation specifies that the iterations of the loop should be executed as asynchronous threads. The threads all share the same address space as the parent program. Each thread, however, has a local copy of the loop control-variable with a different value from the iteration range. The iteration scheme can restrict to a single control-variable and expressions that are not modified within the loop body. Execution does not continue past the multithreaded for-loop until all the threads have individually terminated. It is illegal for the program to contain any kind of jump from inside the loop to outside the loop or from outside the loop to inside the loop. In essence, a multithreaded for-loop is a quantified form of multithreaded block.

Multithreaded and ordinary blocks and for-loops can be arbitrarily nested.

Traditional approaches have often been categorized as either being explicitly multithreaded or implicitly multithreaded. With explicit multithreading, the programmer expresses exactly how the operations of the program are executed by threads. Implicit multithreading is carried out when the programmer writes an ordinary sequential program. The programming system, e.g. the compiler, determines how the operations can be executed by separate threads.

The present application goes beyond the multithreaded concepts described above into a concept of multithreadable code constructs. The multithreadable construct can be executed according to a specified sequential operational semantics. The most common operational semantics would be executed sequentially. An alternative, however, allows the multithreadable code construct to be operated according to multithreaded operational semantics.

Rules are defined that constrain the multithreaded execution such that its result is equivalent to sequential execution.

As disclosed herein, the multithreadable code construct is formed of:

i) a syntactic description of the form of the construct,
  (ii) a sequential operational semantics, that, when executed, defines how to execute the construct sequentially,
  (iii) a multithreaded operational semantics, defining how to execute the construct by a set of threads, and
  (iv) a set of implicit or explicit programming rules that are sufficient to ensure the equivalence of sequential and multithreaded execution of the construct.

The MULTITHREADABLE pragma becomes an assertion by the programmer that the BLOCK or FOR loop can be executed in a multithreaded manner without changing the results of the program. The MULTITHREADABLE pragma can be applied to blocks and for loops in which the statements or iterations are independent of each other. The multithreaded execution is equivalent to sequential execution in this case. It is not a directive that the BLOCK or FOR LOOP must be executed in a multithreaded manner.

As a simple example, consider the following program to sum the elements of a two-dimensional array:

```
void SumElements(float A[N] [N], float *sum, int numThreads)
{
    int i;
    float rowSum[N];
    #pragma multithreadable mapping(blocked(numThreads) )
    for (i = 0; i < N; i++) {
        int j;
        rowSum[i] = 0.0;
        for (j = 0; j < N; j++)
            rowSum[i] = rowSum[i] + A[i] [j] ;
    }
    *sum = 0.0;
    for (i = 0; i < N; i++)
        *sum = *sum + rowSum[i] ;
}
```

Multithreaded execution of the FOR loop is equivalent to sequential execution because the iterations all modify different ROWSUM[I] and J variables. The arguments following the pragma indicate that multithreaded execution should assign iterations to NUMTHREADS different threads using a blocked mapping. There is a rich set of options that control the mapping of iterations to threads.

Therefore, the Multithreaded C preprocessor has two modes: sequential mode in which the MULTITHREADABLE pragma is ignored, and multithreaded mode in which the MULTITHREADABLE pragma is transformed into Sthreads calls. Programs can be developed, tested, and debugged in sequential mode, then executed in multithreaded mode for performance. In addition, performance analysis and tuning can often be performed in sequential mode.

Determinacy of results is an important consequence of the equivalence of multithreaded and sequential execution. If sequential execution is deterministic (which is usually the case), multithreaded execution must also be deterministic. Determinacy is usually desirable, since program development and debugging can be difficult when different runs produce different results. In other multithreaded programming systems, determinacy is difficult to ensure. For example, locks, semaphores, and many-to-one message passing almost always introduce race conditions and hence nondeterminacy. However, nondeterminacy is important for efficiency in some algorithms, e.g., branch-and-bound algorithms.

Multithreaded and multithreadable code constructs are integrated in this system. The programming system incorporates both explicitly multithreaded constructs which must be executed according to the multithreaded semantics, along with multithreadable constructs which may selectively executed according to their sequential or multithreaded semantics. The multithreaded constructs are generally used to express multithreaded algorithms that have no sequential equivalent. This can include controlling different hardware that haw no integration with one another, or controlling simultaneous different windows in a graphical user interface.

Multithreadable constructs are used to express the opportunity to use multithreading to speed up the execution of a computationally-intensive algorithm, by using multiple threads on multiple processors.

By using both multithreaded and multithreadable constructs, the operating system can use one thread to control each window with multithreaded constructs, and the output to each window, within a window, is computed faster with the multiple threads using multithreadable constructs.

As described above, the synchronization can be carried out by an entry S-COUNTER, or an S-FLAG. Each are defined to have certain constraints.

An S-COUNTER, defined in the context of the C programming language, is diagrammed in FIG. 3. It can be defined as a type definition and a set of interface functions. The counters are encapsulated as a class in an object-oriented language such as C++ or Java. The definition of the fundamental programming interface for S-COUNTERS is as follows:

typedef counter type definition Counter;
int InitializeCounter(Counter *c);
/* Initializes value(c) to zero. */
/* Must be called only once, before all other operations on counter c. */
int FinalizeCounter(Counter *c);
/* Must be called only once, after all other operations on c. */
int CheckCounter(Counter *c, unsigned int level);
/* Suspends until value(c) greaterorequal level. */
int IncrementCounter(Counter *c, unsigned int amount);
/* Increases value(c) by amount. */

An S-COUNTER object c implicitly has a nonnegative integer attribute value(c), which can only be accessed through the interface functions. The INITIALIZE function at 300 initializes value(c) to zero or some initial value.

Importantly, the counter is monotonic, as illustrated in 310. No decrement function is defined. Its value monotonically increases.

Any attempt to CHECK the counter, shown as step 320, suspends the calling thread at 325. This prevents a condition which can catch or miss some action occurring during the check operation. Each S-COUNTER maintains a dynamic list of thread suspension queues 330, with one queue for each value on which at least one Check operation is suspended.

CHECK compares value(c) to level and suspends until value(c) becomes greater than or equal to level. This is generically shown as AWAKE in step 340. Increment at 310 atomically increases value(c) by amount, thereby reawakening all Check operations suspended on values less than or equal to the new value(c).

All the functions can return an error code. Possible error conditions include invalid arguments, operations on an uninitialized counter, and counter overflow.

The type definition described above is carefully selected to remove the possibility of race conditions occurring on counter synchronization. There is no DECREASE operation. Therefore, the value of an S-COUNTER is monotonically increasing. There is no possibility of a CHECK operation missing an INCREMENT operation since check suspends the thread. There is no PROBE or nonblocking CHECK operation. It is recognized by the inventor that any instantaneous value may depend on the relative timing of the individual threads. Therefore, no operation can be based on the instantaneous value of an S-COUNTER.

A RESET operation can also be used to efficiently reuse counters between different phases of a program.

Alternatively, the old counters can be deleted and recreated as new counters. RESET simply resets value(c) back to zero. However, to avoid the possibility of race conditions, RESET must not be called concurrently with any other operation on the same counter. RESET ends the process, and is not intended as a means of synchronization between threads.

Another thread synchronization object is a special flag, called an S-FLAG. S-FLAGS, like S-COUNTERS, have restricted allowed operations within the multithreadable code concept. S-FLAGS support SET and CHECK operations. Initially, an S-FLAG is not set. A SET operation on an S-FLAG atomically sets the flag. A CHECK operation on a flag suspends until the flag is set. Once an S-FLAG is set, it remains set.

Flags and counters are provided to provide deterministic synchronization within multithreadable constructs, as previously described.

In summary of the above, an S-COUNTER object has the following operations (expressed in the C programming language):

Initialize (Counter *c)
Finalize(Counter *c)
Increment(Counter *c, unsigned int amount)
Check(Counter *c, unsigned int value)
Reset(Counter *c)

The Initialize operation initializes the Counter object and sets its value to zero. The Finalize operation destroys the Counter object. An Increment operation increases the value of the Counter object by amount. A Check operation suspends the calling thread until the value of the Counter object is at least value. A Reset operation resets the value of the Counter object to zero.

In the following simple example, a "producer thread" produces items and writes them to a buffer. A group of one or more concurrently executed "consumer threads" each independently reads the items from the buffer. The key synchronization issue is to prevent the consumer threads from reading items from the buffer that have not yet been written by the producer thread. The following program fragment gives implementations of the producer thread and consumer threads (in the C programming language) using a counter for synchronization.

```
Counter count;
Item buffer[NUM_ITEMS];
ProducerThread(int blockSize)
{
    int index = 0, c = 0;
    while (index < NUM_ITEMS) {
        buffer[index] = Produce( );
        index = index + 1;
        c = c + 1;
        if (c == blockSize) {
            Increment(count, blockSize);
            c = 0;
        }
    }
}
ConsumerThread(int blockSize)
{
    int index = 0, c = blockSize;
    while (index < NUM_ITEMS) {
        if (c == blockSize) {
            Check(count, index + blockSize);
            c = 0;
        }
        Consume(buffer [index] );
        index = index + 1;
        c = c + 1;
    }
}
```

After writing a block of items to the buffer, the producer thread increments the S-COUNTER. Before reading a block of items from the buffer, a consumer thread checks the counter. If the next block of items has not yet been written to the buffer, the consumer thread suspends until enough items have been written. The program does not require that the producer and consumer threads all use the same blockSize values.

The monotonicity of counters helps guarantee deterministic synchronization and the equivalence of multithreaded and sequential execution.

If shared variables are guarded against concurrent operations, a program that uses only counter synchronization can produce deterministic results on all executions. Moreover, if sequential execution of the program (i.e., execution ignoring the MULTITHREADED keyword) does not deadlock, multithreaded execution is guaranteed not to deadlock and to produce the same results as sequential execution. These properties are extremely useful in the testing and debugging of multithreaded programs.

Even in the absence of concurrent operations on shared variables, traditional synchronization mechanisms can introduce nondeterminacy into a program through timing dependent race conditions between threads. For example, consider the following program that uses a lock:

```
multithreaded {
    { AcquireLock(&xLock) ; x = x+1; ReleaseLock(&xLock) ; }
    { AcquireLock(&xLock) ; x = x*2; ReleaseLock(&xLock) ; }
}
```

Even though there are no concurrent operations on x, the resulting value of x is nondeterministic because of the race condition on the order in which the two threads acquire the lock. In contrast, because counters are monotonic, once a synchronization condition is enabled it remains enabled, and there is no possibility of a race condition to catch or miss a particular counter value. For example, consider the following program that uses a counter:

```
multithreaded {
    { CheckCounter(&xCount, 0) ; x = x+1; IncrementCounter(&xCount, 1) ; }
    { CheckCounter(&xCount, 1) ; x = x*2; IncrementCounter(&xCount, 1) ; }
}
```

The resulting value of x is deterministic, because the CHECKCOUNTER operations will succeed in the same order in all executions, therefore the operations on x will occur in the same order. Moreover, since sequential execution does not deadlock, multithreaded execution cannot deadlock and will always produce the same results as sequential execution.

Programs that use only counter synchronization can still be erroneously nondeterministic if they do not guard against concurrent access to shared variables. For example, consider the following program using a counter:

```
multithreaded {
    { CheckCounter(&xCount, 0) ; x = x+1; IncrementCounter(&xCount, 1) ; }
    { CheckCounter(&xCount, 0) ; x = x*2; IncrementCounter(&xCount, 1) ; }
}
```

The result of the program is nondeterministic because of the possibility of concurrent execution of the operations on x. The nondeterminacy is caused by concurrent access to a shared variable, not by a synchronization race condition.

As a simple example, consider the following program to sum the elements of a two-dimensional array:

```
void SumElements(float A[N] [N], float *sum, int numThreads)
{
    int i;
    SthreadCounter counter;
    SthreadCounterInitialize (&counter) ;
    #pragma multithreadable mapping(blocked(numThreads) )
    for (i = 0; i < N; i++) {
        int j;
        float rowSum;
        rowSum = 0.0;
        for (j = 0; j < N; j++)
            rowSum = rowSum + A[i] [j] ;
        SthreadCounterCheck(&counter, i) ;
        *sum = *sum + rowSum;
        SthreadCounterIncrement (&counter, 1) ;
    }
    SthreadCounterFinalize(&counter) ;
}
```

Without the counter operations, multithreaded execution of the for loop would not be equivalent to sequential execution, because the iterations all modify the same *sum variable. However, the counter operations ensure that multithreaded execution is equivalent to sequential execution. In sequential execution, the iterations are executed in increasing order and the STHREADCOUNTERCHECK operations succeed without suspending. In multithreaded execution, the counter operations ensure that the operations on *sum occur atomically and in the same order as in sequential execution. Iteration i suspends at the STHREADCOUNTERCHECK operation until iteration i−1 has executed the STHREADCOUNTERINCREMENT operation.

Conditions are carved out to prevent concurrent access to shared variables using counters. Essentially, each pair of operations on a shared variable must be separated by a transitive chain of counter operations. If these conditions can be shown to hold in any one execution of the program, they must hold in all executions of the program. Therefore, if sequential execution satisfies the conditions, multithreaded execution is also guaranteed to satisfy the conditions, hence produce the same results as sequential execution. This result forms the basis of a powerful methodology for developing multithreaded programs using sequential reasoning, testing, and debugging techniques.

All the programs using counters so far discussed satisfy the conditions on shared variables, therefore are guaranteed to be deterministic. In addition, the program examples described herein have equivalent multithreaded and sequential execution. The cost of increased determinacy is decreased concurrency. Synchronization using counters provides an effective means of controlling this tradeoff between determinacy and concurrency.

Counters can also be used as a stronger form of lock synchronization, providing sequential ordering in addition to mutual exclusion on a critical section. With the traditional implementation of mutual exclusion using a pair of lock operations, the order in which threads enter the critical section is nondeterministic. This is desirable in terms of maximizing concurrency, but is undesirable in terms of reasoning, testing, and debugging, and simply might not satisfy the desired program specification. Replacing the pair of lock operations with a pair of counter operations can guarantee deterministic results, at the cost of decreased opportunities for concurrency.

Consider the computation of a result object formed by accumulating a series of independent subresults that are computed concurrently. For example, the result object could be a linked list and the accumulate operation could be an append, or the result object could be a summation and the accumulate operation could be an addition. Mutual exclusion is required to prevent interference between multiple concurrent accumulate operations on the result object.

The following program implements the computation with one thread computing each subresult, and a pair of lock operations to provide mutual exclusion:

```
CompositeItem result;
Lock resultLock;
InitializeLock(&resultLock) ;
multithreaded for (i = 0; i < N; i++) {
    SingleItem subresult = compute(i) ;
    AcquireLock(&resultLock) ;
    accumulate(&result, subresult) ;
    ReleaseLock(&resultLock) ;
}
FinalizeLock(&resultLock) ;
```

Only one thread can hold RESULTLOCK at any given time, thereby ensuring mutual exclusion of the ACCUMULATE operations. However, if the accumulate operation is not associative and determinacy of results is desired, some other mechanism is required to ensure sequential (or at least deterministic) ordering, in addition to mutual exclusion. For example, neither appending an item to a linked list, nor floating point addition are associative operations. With both these examples, the above program may produce different results on repeated executions.

The following program implements the computation with the pair of lock operations replaced with a pair of counter operations, to provide both mutual exclusion and sequential ordering:

```
CompositeItem result;
Counter resultCount;
InitializeCounter(&resultCount) ;
multithreaded for (i = 0; i = 0; i++) {
    SingleItem subresult = compute(i) ;
    CheckCounter(&resultCount, i) ;
    accumulate(&result, subresult) ;
    IncrementCounter(&resultCount, 1) ;
}
FinalizeCounter(&resultCount) ;
```

As with the lock program, only one ACCUMULATE operation can execute at any given time. However, the accumulate operations are now additionally constrained to execute in sequential order. RESULTCOUNT[I]=I indicates that thread I−1 has completed its accumulate operation. The counter program has greater determinacy at the cost of less concurrency. With the lock program, an ACCUMULATE operation can execute concurrently with compute operations in all other threads with the counter program, an ACCUMULATE operation can only execute concurrently with compute operations in higher numbered threads.

The optimal tradeoff between determinacy and concurrency has to be made on a case by case basis. Counters are a powerful mechanism for providing sequential ordering on top of mutual exclusion in the many cases where determinacy is important and the performance consequences of less concurrency are not great.

The Sthreads Interface

The code produced according to the present application can be expressed using the Multithreaded C pragma notation. As described previously, there is a direct correspondence between the pragma notation for thread creation and the Sthreads library functions that support thread creation. As a simple example, the following is a program implemented using Sthreads:

```
typedef struct {
    float (*A) [N] ;
    float *sum;
    SthreadCounter *counter;
} LoopArgs;
void LoopBody(int i, int notused1, int notused2, LoopArgs *args)
{
    int j;
    float rowSum;
    rowSum = 0.0;
    for (j = 0; j < N; j++)
        rowSum = rowSum + (args->A) [i] [j] ;
    SthreadCounterCheck(args->counter, i) ;
    * (args->sum) = *(args->sum) + rowSum;
    SthreadCounterIncrement(args->counter, 1) ;
}
void SumElements(float A[N] [N], float *sum, int numThreads)
{
    int i;
    SthreadCounter counter;
    LoopArgs args;
    SthreadCounterInitialize(&counter) ;
    args.A = A;
    args.sum = sum;
    args.counter = &counter;
    SthreadRegularForLoop {
        (void (*) (int, int, int, void *) ) LoopBody,
        (void *) &LoopArgs,
        0, STHREAD_CONDITION_LT, N, 1,
        1, STHREAD_MAPPING_BLOCKED, numThreads,
        STHREAD_PRIORITY_PARENT,
        STHREAD_STACK_SIZE_DEFAULT) ;
    SthreadCounterFinalize(&counter) ;
}
```

Although this program is syntactically more complicated than the Multithreaded C version, it is considerably less complicated than the same program expressed using Windows NT threads. The mechanics of creating threads, assigning iterations to threads, and waiting for thread termination is handled within the Sthreads library call.

The Sthreads multithreaded programming system is implemented as a transparent add-on to an existing program development system, e.g., a compiler or interpreter, or other program development environment. The notation and implementation allows multithreaded and multithreadable code constructs to be directly translated into a high-level structured thread library. This translation is implemented as a preprocessor that can be transparently called prior to the standard compilation phase in an existing program development system.

For example, when integrated with the Microsoft Visual C++ programming system, the standard CL (Compiler-Linker) is replaced by a special Sthreads tool that calls the Sthreads preprocessor on program files, then calls the standard (renamed) Visual C++ CL.

Integration of Sthreads with existing programming systems allows programmers new flexibility without adopting new programming systems to use the power of multithreading. They can use their standard editor, debugger, compiler, etc., and simply add Sthreads to the system. It also means that Sthreads piggybacks on the quality of code generation and error analysis of the underlying development system.

Preprocessing had previously been used for many kinds of program "source-to-source" transformations. Sthreads in contrast, implements a full-fledged, sophisticated multi-threaded programming system by using a preprocessing integrated with a standard program development environment.

One implementation has been created in the ANSI C language, thereby defining a "Multithreaded C" language. A structured thread library (Sthreads) is called by the languages. In both Multithreaded C and Sthreads, thread creation constructs are multithreaded variants of sequential "block" (i.e., sections of program code distinctly defined by conventional program constructs) and "for loop" constructs. In the Multithreaded C implementation, these constructs are supported as pragma annotations to a sequential program. With Sthreads, exactly the same constructs are supported as library calls. At both levels, synchronization objects and operations are supported as Sthreads library calls. In this embodiment, the Sthreads library for Windows NT can be implemented as a very thin layer on top of the Win32 thread API. As a consequence, there is essentially no performance overhead associated with using Sthreads or Multithreadable C, as compared to using Win32 threads directly.

Multithreaded C is implemented as a portable source-to-source preprocessor that directly transforms annotated blocks and for loops into equivalent calls to the Sthreads library. The programmer has the option of either using the pragma annotations and preprocessor or making Sthreads calls directly. The Sthreads library and Multithreaded C preprocessor are integrated with Microsoft Developer Studio Visual C++. Building a project preferably automatically invokes the preprocessor where necessary and links with the Sthreads library.

Multithreadable blocks and for loops are implemented as a sequence of CREATETHREAD calls followed by a WAIT-FORSINGLEOBJECT call on an event. Terminating threads perform an INTERLOCKEDDECREMENT call on a counter, and the last thread to terminate performs a SETEVENT call on the event. Flags are implemented directly as Win32 events. Counters are implemented as linked lists of Win32 events, with one event for every value on which some thread is waiting. Locks are implemented directly as Win32 critical sections. Barriers are implemented as a pair of Win32 events and a Win32 critical section.

An important issue of the multithreading operation comes about when considering multiple processors. The hardware and operating systems of modern technology allow for multiprocessor systems. Current operation in multiprocessor systems, however, have often simply operated on one but not the other processor. By multithreading in this way, the different threads can actually be executed on the different processors.

In operation, when a multithreading indicator (such as a "compile as multithreaded" flag/button/environment-variable) is set, both multithreadable and multithreaded blocks/loops are compiled to multithreaded code. When the multithreading indicator is not set, the multithreaded blocks/loops are compiled to multithreaded code and the multithreadable blocks/loops are compiled into ordinary sequential code. This allows a programmer to mix constructs that only have a multithreaded meaning (e.g., real-time control and systems programming uses of threads) with constructs that can be compiled into threads for multiprocessor performance or compiled into equivalent sequential code when developing and debugging.

The invention allows a program to run as fast as a sequential program on one processor, but significantly faster on multiprocessors, without recompilation, relinking, or reconfiguration. The invention thus allows a program to adapt dynamically to changing resources. Use of monotonic flags and monotonic counters makes embodiments of the invention reliable and timely.

The mapping of Statements/Iterations onto threads is relatively simple. One thread is used for each statement/chunk, or for a small number of statements/chunks.

A Typical for loop may have thousands or millions of iterations. The Overhead associated with assigning units of work to threads is significant. The present application defines assigning the iterations in contiguous "chunks". Significant unit of work should be performed by each chunk. For example:

PRAGMA MULTITHREADABLE CHUNKSIZE(1000), MAPPING (BLOCKED(T))
FOR (I=0; I<N; I++)
A[I]=B[I];

Interaction of Chunksize and Mapping is described in the following example:

PRAGMA MULTITHREADABLE CHUNKSIZE(2), MAPPING (BLOCKED(4))
FOR (I=50; I>=10; I=I−2)
DOSOMETHING(I)

The Complete Sthreads Library includes a number of statements:

Processor Management: STHREADSGETNUMPROCESSORSPRESENT, STHREADSSETNUMPROCESSORSUSED, STHREADSGETPROCESSORSPRESENT, STHREADSSETPROCESSORSUSED.

Thread Creation: STHREADSBLOCK, STHREADSREGULARFORLOOP.

Thread Scheduling: STHREADSGETCURRENTPRIORITY, STHREADSSETCURRENTPRIORITY.

Flags: STHREADSFLAGINITIALIZE, STHREADSFLAGFINALIZE, STHREADSFLAGSET, STHREADSFLAGCHECK, STHREADSFLAGRESET.

Counters: STHREADSCOUNTERINITIALIZE, STHREADSCOUNTERFINALIZE, STHREADSCOUNTERINCREMENT, STHREADSCOUNTERCHECK, STHREADSCOUNTERRESET.

Locks: STHREADSLOCKINITIALIZE, STHREADSLOCKFINALIZE, STHREADSLOCKACQUIRE, STHREADSLOCKRELEASE.

Barriers: STHREADSBARRIERINITIALIZE, STHREADSBARRIERFINALIZE, STHREADSBARRIERPASS, STHREADSBARRIERRESET.

Examples of computer program code implementing each of these constructs are set forth in the appendix.

Figure 4:
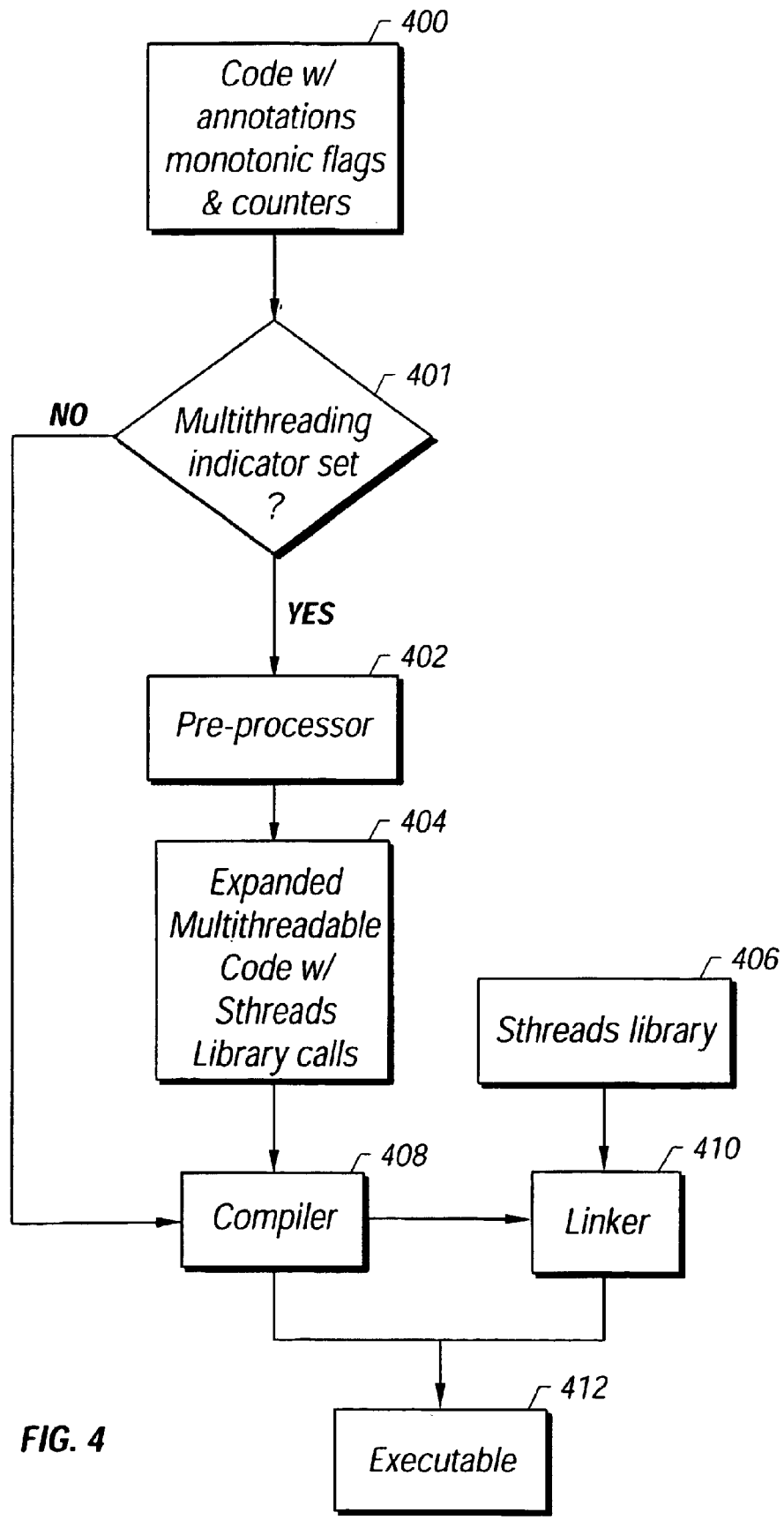
FIG. 4 shows a flowchart of Sthreads execution of a program.

FIG. 4 is a process flowchart showing a method for compiling multithreadable code in accordance with one embodiment of the invention. The computer program source code text 400 includes annotations defining multithreadable code constructs (and, optionally, multithreaded code constructs) and any necessary processor management, thread creation, and synchronization constructs (such as monotonic flags and counters). If a multithreading indicator is set 401, the source code text 400 is processed by a pre-processor 402 that parses the source into an expanded computer program text. The expanded computer program text includes inserted calls to an Sthreads library 406 to invoke multithreded program operations wherever a source code annotation called for multithreadable, functionality. A conventional compiler 406 then communicates with a linker 410 which links pre-existing routines from the Sthreads library 406 with the output of the complier to create an executable module 412.

If the multithreading indicator is not set 401, the original computer program source code text 400 is compiled and is linked in conventional fashion, with each section of multithreadable code constructs compiled as sequentially executing code. Annotations not recognized by the compiler 408 are ignored.

A convenient implementation shortcut that permits ready use of conventional compilers and linkers is to rename a pre-existing compiler-linker executable file to a new name, and assign the old name of the compiler-linker executable file to the pre-processor. The pre-processor then can call the compiler-linker executable file when needed by invoking the new name.

Synchronization Using Locks

Locks are provided to express nondeterministic synchronization, usually mutual exclusion, within multi-threaded BLOCKS and FOR loops. Sthread locks support the usual ACQUIRE and RELEASE operations. The order in which concurrent ACQUIRE operations succeed is nondeterministic. Therefore, there is very little use for locks within multi-threadable blocks and FOR loops. As a simple example, consider the following program to sum the elements of a two-dimensional array:

```
void SumElements(float A[N] [N], float *sum, int numThreads)
{
    int i;
    SthreadLock lock;
    SthreadLockInitialize (&lock) ;
    #pragma multithreaded mapping (blocked(numThreads) )
    for (i = 0; i < N; i++) {
        int j;
        float rowSum;
        rowSum = 0.0;
        for (j = 0; j < N; j++)
            rowSum = rowsum + A[i] [j] ;
        SthreadLockAcquire(&lock) ;
        *sum = *sum + rowSum;
        SthreadLockRelease(&lock) ;
    }
    SthreadLockFinalize(&lock) ;
}
```

Like the flag operations in the program, the lock operations in this program ensure that the operations on *SUM occur atomically. However, unlike the flag operations, the lock operations do not ensure that the operations on *SUM occur in the same order as in sequential execution, or even in the same order each time the program is executed. Therefore, since floating-point addition is not associative, the program may produce different results each time it is executed. However, because execution order is less restricted, this program allows more concurrency than the program described above. This is an example of the commonly-occurring tradeoff between determinacy and efficiency.

Synchronization Using Barriers

S-thread barriers are provided to express collective synchronization of a group of threads in cases when thread termination and recreation is too expensive. The barriers described herein support the usual PASS operation. All the threads in a group must enter the PASS operation before all the threads in the group are allowed to leave the Pass operation. In current systems, the cost of N threads executing a PASS operation is less than the cost of creating and terminating N threads. Therefore, a typical use of barriers is to replace a sequence of multithreadable loops with a single multithreaded loop containing a sequence of barrier PASS operations. However, with modern lightweight thread systems such as Windows NT, we are discovering that barriers are required for efficiency in very few circumstances.

A number of examples are described herein.
Trivial Example: Independent Iterations

```
INT ARRAYSUM(FLOAT A[N] [N] )
/* SUMS THE ELEMENTS OF A 2-DIMENSIONAL ARRAY. */
{
    FLOAT SUM, ROWSUM[N] ;
    INT I;
    SUM = 0.0;
    #PRAGMA MULTITHREADABLE
    FOR (I = 0; I < N; i++) {
        INT J;
        ROWSUM[I] = 0.0;
        FOR (J = 0; J < N; J++)
            ROWSUM[I] = ROWSUM[I] + A[I] [J] ;
    }
    FOR (i = 0; I < N; I++)
        SUM = SUM + ROWSUM[I] ;
    RETURN SUM;
}
```

A more difficult example is shown in the following.

```
INCORRECT EXAMPLE: NONDETERMINACY
INT ARRAYSUM(FLOAT A[N] [N] )
/* SUMS THE ELEMENTS OF A 2-DIMENSIONAL ARRAY. */
{
    FLOAT SUM;
    INT I;
    STHREADSLOCK SUMLOCK;
    STHREADSLOCKINITIALIZE(&SUMLOCK) ;
    SUM = 0.0;
    #PRAGMA MULTITHREADABLE
    FOR (I = 0; I < N; i++) {
        INT j;
        FLOAT ROWSUM = 0.0;
        FOR (J = 0; J < N; J++)
            ROWSUM = ROWSUM + A[I] [j] ;
        STHREADSLOCKACQUIRE(&SUMLOCK) ;
        SUM = SUM + ROWSUM;
        STHREADSLOCKRELEASE(&SUMLOCK) ;
    }
    STHREADSLOCKFINALIZE(&SUMLOCK) ;
    RETURN SUM;
}
INT ARRAYSUM(FLOAT A[N] [N] )
/* SUMS THE ELEMENTS OF A 2-DIMENSIONAL ARRAY. */
{
    FLOAT SUM;
    INT I;
    STHREADSCOUNTER SUMCOUNT;
    STHREADSCOUNTERINITIALIZE(&SUMCOUNT) ;
    SUM = 0.0;
    #PRAGMA MULTITHREADABLE
    FOR (I = 0; I < N; i++) {
        INT J;
        FLOAT ROWSUM = 0.0;
        FOR (J = 0; J < N; J++)
            ROWSUM = ROWSUM + A[I] [J] ;
        STHREADSCOUNTERCHECK(&SUMCOUNT, I) ;
        SUM = SUM + ROWSUM;
        STHREADSCOUNTERINCREMENT(&SUMCOUNT, 1) ;
    }
    STHREADSCOUNTERFINALIZE(&SUMCOUNT) ;
    RETURN SUM;
```

As can be seen, iterations cannot be executed as separate threads because of nondeterminacy in the top. However, the counters allow determinacy between the system therefore enabling the system to be multithreaded.

Single-Writer Multiple-Reader Broadcast

Counters can be used to provide elegant, flexible, and efficient dataflow synchronization between a single writer and multiple readers of a sequence of items written to an array. In this synchronization pattern, reading an item does not remove it from the sequence—each reader independently reads the entire shared array. Because a counter has multiple thread suspension queues, a single counter object can be used to synchronize the writer thread and any number of completely independent reader threads, with each thread potentially having a different granularity of synchronization. The writer thread incrementing the counter broadcasts the availability of data to the entire set of reader threads.

The following program demonstrates the single-write multiple-reader broadcast pattern with synchronization on every item:

```
void Writer(Item *data, int n, Counter *dataCount)
{
    int i;
    for (i = 0; i < n; i++) {
        data[i] = GenerateItem(i);
        IncrementCounter(dataCount, 1);
    }
}
void Reader(Item *data, int n, Counter *dataCount)
{
    int i;
    for (i = 0; i < n; i++) {
        CheckCounter(dataCount, i+1);
        UseItem(data[i]);
    }
}
...
Item data[N];
Counter dataCount;
int r;
InitializeCounter(&dataCount);
multithreaded {
    Writer(data, N, dataCount);
    multithreaded for (r = 0; r < numReaders; r++)
        Reader(data, N, dataCount);
}
FinalizeCounter(&dataCount);
...
```

One WRITER thread and an arbitrary number of Reader threads are executed concurrently, with communication through the shared data array, and synchronization through the DATACOUNT counter. At any point, some Reader threads may be suspended in their CHECKCOUNTER operation, waiting for the writer thread to increment DATACOUNT, while other Reader threads may be reading data items that have previously been written. The READER threads execute independently of each other and do not synchronize their actions in any manner. The synchronization pattern is strictly a one-to-many broadcast from the WRITER thread to the READER threads.

Synchronization on every item that is written and read may be too expensive if the time taken to generate and use an item is too small. The single-reader multiple-writer broadcast pattern can be generalized to allow the writer and each reader thread to synchronize on a block of items instead of on individual items. The following program adds an individual granularity of blocked synchronization to the writer and each reader thread:

```
void Writer(Item *data, int n, Counter dataCount, int blockSize)
{   int i;
    for (i = 0; i < n; i++) {
        data[i] = GenerateItem(i);
        if ((i+1)%blockSize == 0)
            IncrementCounter(dataCount, blockSize);
    }
```

```
    IncrementCounter(dataCount, n-(n/blockSize)blockSize);
}
void Reader(Item *data, int n, Counter *dataCount, int blockSize)
{
    int i;
    for (i = 0; i < n; i++) {
        if (i%blockSize == 0)
            CheckCounter(dataCount, min(i+blockSize), n));
        UseItem(data[i]);
    }
}
```

The WRITER and READER threads now increment and check the DATACOUNT counter in multiples of BLOCKSIZE and write and read the data array in blocks of items. There is no requirement that BLOCKSIZE be the same in all threads. Different threads can be passed different BLOCKSIZE based on their individual performance characteristics and requirements. This pattern is now extremely flexible and easily adaptable with regard to practical performance tuning.

The single-writer multiple-reader broadcast pattern is a dataflow synchronization pattern that occurs in many diverse applications of threads to multiprocessing. For example, in the Paraffins Problem, an array of molecules of a certain size can be generated by one thread and concurrently read by other threads that in turn generate arrays of larger molecules. The pattern is very different from, for instance, the multiple-writers multiple-readers bounded-buffer problem, which is elegantly solved using semaphores. Just as counters are not well suited to implementing bounded buffers, semaphores and other traditional synchronization mechanisms are not well suited to implementing the single-writer multiple-reader broadcast pattern.

Another Example Application: Aircraft Route Optimization

The Aircraft Route Optimization Problem is part of the U.S. Air Force Rome Laboratory C3I Parallel Benchmark Suite. For this application, we achieved better performance using Sthreads on a quad-processor Pentium Pro system running Windows NT than the best reported results for message-passing programs running on expensive Cray and SGI supercomputers with up to 64 processors The flexibility of shared-memory, lightweight multithreading, and sequential development methods allowed us to develop a much more sophisticated and efficient algorithm than would be possible on a message-passing supercomputer.

The C3I Parallel Benchmark Suite

The U.S. Air Force Rome Laboratory C3I Parallel Benchmark Suite consists of eight problems chosen to represent the essential elements of real C3I (Command, Control, Communication, and Intelligence) applications. Each problem consists of the following:

A problem description giving the inputs and required outputs.

An efficient sequential program (written in C) to solve the problem.

The benchmark input data.

A correctness test for the benchmark output data.

For some of the problems, a parallel message-passing program is also provided. Rome Laboratory maintains a publicly accessible database of reported performance results.

The C3I Parallel Benchmark Suite provides a good framework for evaluating our structured multithreaded programming system. The problems are computationally intensive and involve a variety of complex algorithms and data structures. The sequential program provides us with a good starting point and a fair basis for performance comparison. The performance database allows us to compare our results with those of other researchers. For these reasons, we are developing multithreaded solutions to several of the C3I Parallel Benchmark Suite problems.

The task in the Aircraft Route Optimization Problem is to find the lowest-risk path for an aircraft from an origin point to a set of destination points in the airspace over an uneven terrain. The risk associated with each transition in the airspace is determined by its proximity to a set of threats. The problem involves realistic constraints on aircraft speed and maneuverability. The aircraft is also constrained to fly above the underlying terrain and beneath a given ceiling altitude.

The problem is essentially the single-source, multiple-destination shortest path problem with a large, sparsely connected graph. The airspace for the benchmark is 100 km by 100 km in area and 10 km in altitude, discretized at 1 km intervals. The 100,000 positions in space correspond to 2,600,000 nodes in the graph, since each position can be reached from 26 different directions. Because of aircraft speed and maneuverability constraints, each node is connected to only nine or ten geographically adjacent nodes. Therefore, the graph consists of approximately 2.6 million nodes and 26 million edges.

The sequential algorithm to solve the Aircraft Route Optimization Problem is based on a queue of nodes. Initially the queue is empty except for the origin node. At each step, one node is removed from the queue. Valid transitions from this source node to all adjacent destination nodes are considered. For each destination node, if the path to the node via the source node is shorter than the current shortest path to the node, the path to the node is updated and the node added to the queue. The algorithm continues until the queue is empty, at which stage the shortest paths to all reachable nodes have been computed.

The queue is ordered on path length so that shorter paths are expanded before longer paths. This has a significant effect on performance. Without ordering, longer paths are expanded, then discarded when shorter paths to the same points are expanded later in the computation. However, whether the queue is ordered, partially ordered, or unordered does not affect the results of the algorithm.

The most straightforward approach to obtaining parallelism in the Aircraft Route Optimization Problem is to geographically partition the airspace into blocks, with one thread (or process) responsible for each block. Each thread runs the sequential algorithm on its own block using its own local queue and periodically exchanges boundary values with neighboring blocks. This approach is particularly appealing on distributed-memory, message-passing platforms, because memory can be permanently distributed according to the blocking pattern. If the threads execute a reasonably large number of iterations between boundary exchanges, good load balance can be achieved.

The problem with this algorithm is that, as the number of blocks/threads is increased the total amount of computation also increases. Therefore, any speedup is based on an increasingly inefficient underlying algorithm. At any time, the local queues in most blocks contain paths that are too long and are irrelevant to the actual shortest paths. The processors are kept busy performing computation that is later discarded. At any given time, it is only productive to work on an irregular and unpredictable subset of the graph. However, irregular and adaptive blocking schemes do not solve the problem, since there is usually equal work available in all blocks. The issue is the distinction between productive and unproductive work.

Our solution is to statically partition the airspace into a large number of blocks and to use a much smaller number of threads. A measure of the average path length is maintained with each local queue. At each step, the blocks with local queues containing the shortest paths are assigned to the threads. Therefore, the subset of blocks that are active and the assignment of blocks to threads change dynamically throughout program execution. This algorithm takes advantage of the symmetric multiprocessing model, in which all threads can access the entire memory space with uniform cost. It also takes advantage of the lightweight multithreading model to achieve good load balance, since the workload within each thread at each step is highly variable.

The ability to develop, test, and debug using sequential methods was crucial in the development of this sophisticated multithreaded algorithm. The entire program was tested and debugged in sequential mode before multithreaded execution was attempted. In particular, development of the complex boundary exchange and queue update algorithms would have been considerably more difficult in multithreaded mode.

The ability to analyze and tune performance using sequential methods was also very important. Good performance depended on exposing enough parallelism without significantly increasing the total amount of computation. We determined efficient values for the number of blocks, the number of threads, and the number of iterations between boundary exchanges by measuring computation times and operation counts of the multithreaded program in running in sequential mode. This detailed analysis would have been very difficult to perform in multithreaded mode. We avoided memory contention in multithreaded mode by avoiding cache misses in sequential mode. The analysis of memory access patterns in sequential mode is much simpler than in multithreaded mode.

All Pairs Shortest Paths Example

This example describes the algorithmic and performance advantages of counter synchronization. In the example, a counter is used as a less restrictive, and consequently more efficient, replacement for a barrier. The example program is a multithreaded solution to the all-pairs shortest-path problem using the Floyd-Warshall algorithm. Using traditional synchronization mechanisms, this problem can be solved using one barrier or, more efficiently, an array of condition variables. We show how the efficient solution can be implemented using a single counter instead of an array of condition variables. We give timing measurements comparing the performance of the barrier, condition variable, and counter algorithms.

The all-pairs shortest-path problem takes as input the edge-weight matrix of a weighted directed graph, and returns the matrix of shortest-length paths between all pairs of vertices in the graph. The graph is required to have no cycles of negative length, and the weight of the edge from a vertex to itself is required to be zero.

The following program solves the all-pairs shortest-path problem using the sequential Floyd-Warshall algorithm:

```
VOID SHORTESTPATHS1 (INT EDGE[N] [N], INT PATH[N] [N])
{
    INT K, I, J;
    PATH[0..N-1] [0..N-1] = EDGE[0..N-1] [0..N-1];
    FOR (K = 0; K < N; K++)
        FOR (I = 0; I < N; I++)
            FOR (J = 0; J < N; J++) {
                INT NEWPATH = PATH[I] [K] + PATH[K] [J];
                IF (NEWPATH < PATH[I] [J]) PATH[I] [J] = NEWPATH;
            }
}
```

Initially, PATH[I] [J] is assigned EDGE[I] [J], for all I and J. (For brevity, we use a notational shorthand for array assignment.) After the kth iteration, PATH[I] [J] is the shortest path from vertex I to vertex J with intermediate vertices only in vertices 0 to k. Therefore, after N iterations, PATH[I] [J] is the shortest path from vertex i to vertex j with no restrictions on the intermediate vertices.

The following program solves the all-pairs shortest path problem using a multithreaded version of the Floyd-Warshall algorithm, with a barrier for thread synchronization:

```
void ShortestPaths2(int edge[N] [N], int path[N] [N], int numThreads)
{
    int t;
    Barrier b;
    path[0..N-1] [0..N-1] = edge[0..N-1] [0..N-1];
    InitializeBarrier(&b, numThreads);
    multithreaded for (t = 0; t < numThreads; t++) {
        int k, i, j;
        for (k = 0; k < N; k++) {
            for (i = t*N/numThreads; i < (t+1)*N/numThreads; i++)
                for (j = 0; j < N; j++) {
                    int newPath = path[i] [k] + path[k] [j];
                    if (newPath < path[i] [j]) path[i] [j] = newPath;
                }
            PassBarrier(&b);
        }
    }
    FinalizeBarrier(&b);
}
```

The multithreaded outer loop creates NUMTHREADS threads. Each thread executes the N iterations of the Floyd-Warshall algorithm on a subset of the rows of the path matrix. To keep the iterations synchronized, the threads pass through an N-way barrier at the end of each iteration. There are no sharing violations on the concurrent accesses to PATH across the threads, because the algorithm will never assign to PATH[I] [K] or PATH[K] [J] during iteration k.

The barrier algorithm successfully divides the work among an arbitrary number of threads. However, in requiring that all threads complete each iteration before any thread begins the next iteration, the algorithm does not express the full opportunities for concurrency inherent in the data dependencies. As a consequence, the program is less than optimally efficient. N-way synchronization at the barrier is a bottleneck that creates delays on entry and exit, and processor load imbalance can occur if all threads do not reach the barrier simultaneously.

A More Efficient Multithreaded Solution Using Condition Variable Synchronization The following program solves the all-pairs shortest path problem using a more efficient multithreaded version of the Floyd-Warshall algorithm, with an array of N condition variables for thread synchronization:

```
void ShortestPaths3(int edge[N] [N], int path[N] [N], int numThreads)
{
    int k, t;
    Condition kDone[N];
    int kRow[N] [N];
    path[0..N-1] [0..N-1] = edge[0..N-1] [0..N-1];
    for (k = 0; k < N; k'+) InitializeCondition(&kDone[k]);
    kRow[0] = path[0] [0..N-1];
    SetCondition(&kDone[0]);
    multithreaded for (t = 0; t < numThreads; t++) {
        int k, i, j;
        for (k = 0; k < N; k++) {
            CheckCondition(&kDone[k]);
            for (i = t*N/numThreads; i < (t+1)*N/numThreads; i++) {
                for (j = 0; j < N; j++) {
                    int newPath = path[i] [k] + kRow[k] [j];
                    if (newPath < path[i] [j]) path[i] [j] = newPath;
                }
                if (i == k+1) {
                    kRow[k+1] [0..N-1] = path[k+1] [0..N-1];
                    SetCondition(&kDone[k+1]);
                }
            }
        }
    }
    for (k = 0; k < N; k++) FinalizeCondition(&kDone[k]);
}
```

As with the barrier algorithm, each thread executes the N iterations of the Floyd-Warshall algorithm on a subset of the rows of the PATH matrix. However, each thread can individually continue with its next iteration as soon as the necessary data is available, instead of waiting for the previous iteration to complete in all the other threads. Condition variable KDONE[K] is set when row k of the PATH matrix has been computed in iteration K-1. Each thread waits on KDONE[K] before executing iteration k. To avoid sharing violations, row k of the PATH matrix computed in iteration K-1 is stored in KROW[K].

The condition variable algorithm avoids the inefficiencies associated with barrier synchronization. Threads synchronize individually, rather than in an N-way bottleneck, and faster threads can execute many iterations ahead of slower threads. Potentially, the N threads can be executing in up to N different iterations. One extra cost of this algorithm is the storage for the KROW matrix. However, the most significant extra cost is allocation of N condition variables.

The following program solves the all-pairs shortest path problem using the efficient multithreaded version of the Floyd-Warshall algorithm, with a single counter for thread synchronization in place of N condition variables:

```
void ShortestPaths3(int edge[N] [N], int path[N] [N], int numThreads)
{
    int k, t;
    Counter kCount;
    int kRow[N] [N];
    path[0..N-1] [0..N-1] = edge[0..N-1] [0..N-1];
    InitializeCounter(&kCount);
    kRow[0] = path[0] [0..N-1];
    multithreaded for (t = 0; t < numThreads; t++) {
        int k, i, j;
        for (k = 0; k < N; k++) {
            CheckCounter(&kCount, k);
            for (i = t*N/numThreads; i < (t+1)*N/numThreads; i++) {
                for (j = 0; j < N; j++) {
                    int newPath = path[i] [k] + kRow[k] [j];
                    if (newPath < path[i] [j]) path[i] [j] = newPath;
                }
                if (i == k+1) {
                    kRow[k+1] [0..N-1] = path[k+1] [0..N-1];
                    IncrementCounter(&kCount, 1);
                }
            }
        }
    }
    FinalizeCounter(&kCount);
}
```

Operations on N different values of the single counter replace operations on N different elements of the array of condition variables. The algorithm has the same performance advantages over the barrier algorithm, without the cost of statically allocating and maintaining N synchronization objects. Internally, the counter may create synchronization objects for the distinct counter values on which threads are suspended. However, in practice, the number of these objects in existence at any given time is likely to be a small fraction of N.

Three Synchronization Patterns Example

Three examples of practical synchronization patterns are described that can be expressed more elegantly (and often more efficiently) using counters than with traditional synchronization mechanisms. For each of these synchronization patterns, a small example program is provided to demonstrate the pattern and a description of the importance of the pattern to real problems. This is far from an exhaustive list of patterns to which counters can usefully be applied. Counters are equally applicable to many other situations, particularly dataflow style synchronization patterns arising in the application of threads to multiprocessing.

Counters can often be used to replace traditional barrier synchronization with a less restrictive form of "ragged" barrier. With a ragged barrier, each thread waits at the barrier point only until its own individual data dependencies have been satisfied, instead of until the data dependencies of all threads have been satisfied, as with a traditional barrier. We have already given one example of this pattern in Section 0, with the multithreaded Floyd-Warshall algorithm to solve the all-pairs shortest-path problem. In this section, we give another more straightforward example, based on boundary exchange in a time-stepped simulation.

Consider a time-stepped simulation of a one-dimensional object subdivided into N cells. The state of internal cell i at time t is a function of the states of cells i−1, i, and i+1 at time t−1. The states of the leftmost and rightmost cells remain constant over time. An example is simulation of heat transfer along a metal rod. Similar boundary exchange requirements occur in most multithreaded simulations of physical systems in one or more dimensions. These requirements are traditionally satisfied using barrier synchronization.

The following program implements the simulation using one thread for each cell, with traditional barrier synchronization between threads before cell state exchanges and updates at each time step:

```
float state[N];
Barrier b;
...
state[0..N-1] = initial cell states;
InitializeBarrier(&b, N-2):
multithreaded for(i = 1; i < N-1; i++) {
    float leftState; rightState;
    for (t = 1; t <= numSteps; t++) {
        PassBarrier(&b);
        leftState = state[i-1];
        rightState = state[i+1];
        PassBarrier(&b);
        state[i] = f(leftState, state[i], rightState);
    }
}
FinalizeBarrier(&b):
```

All threads synchronize at the barrier twice every time step: once before exchanging cell states, and again before updating cell states. However, complete barrier synchronization between all threads is unnecessarily restrictive. The conditions for safely exchanging and updating the cell states involve dependencies between pairs of neighboring cells, not across all cells. As a consequence of using barriers, the performance of the program is potentially subject to synchronization bottleneck and load imbalance problems.

The following program implements the same simulation using an array of counters to provide ragged barrier synchronization between threads:

```
float state[N];
Counter c[N];
...
state[0..N-1] = initial cell states;
for (i = 0; i < N; i++) CounterInitialise(&c[i]);
IncrementCounter(&c[0], 2*numSteps);
IncrementCounter(&c[N-1]), 2*numSteps);
multithreaded for(i = 1; 1 < N-1; i++) {
    float leftState, rightState, myState = state[i];
    for (t = 1; t <= numSteps; t++) {
        CheckCounter(&c[i-1], 2*t-2)); leftState = state[i-1];
        CheckCounter(&c[i+1], 2*t-2)); rightState = state[i+1];
        IncrementCounter(&c[i], 1);
        myState = f(leftState, myState, rightState);
        CheckCounter(&c[i-1], 2*t-1);
        CheckCounter(&c[i+1], 2*t-1);
        state[i] = myState;
        IncrementCounter(&c[i], 1);
    }
}
for (i = 0; i < N; i++) FinalizeCounter(&c[i]);
```

As with the traditional barrier algorithm, the threads synchronize every time step before exchanging cell states, and again before updating cell states. However, the synchronization is between pairs of neighboring threads via an array of counters. c[I]=2*T−1 indicates that thread I has finished reading both neighboring cell states in time step T, and c[I]=2*T indicates that thread I has completed time step T. Pairwise synchronization removes the synchronization bottleneck of a traditional barrier and reduces load imbalance by allowing some threads to execute ahead of other threads. The barrier could be made even more ragged using separate counters to synchronize with left and right neighbors.

The major cost in the implementation of ragged barriers using counters is the need for N counter objects instead of one barrier object. However, the number of counters needed is proportional to the number of threads, not to the problem size. This cost is unlikely to be a practical problem on modern computer systems.

The present application can be used in multithreaded programming system, with any single or multiprocessor computers. Example multithreaded programming systems include Windows NT, UNIX/Pthreads and Java.

Other examples than those discussed above can of course be used. While the three examples discussed above are computationally intensive, other computationally intensive systems include volume rendering, terrain masking, threat analysis, protein folding, and molecular dynamics simulation.

As can be seen from the above, the system of the present application is highly advantageous and produces significant advantages.

Although only a few embodiments have been disclosed in detail above, other modifications are possible, and would understood by those having ordinary skill in the art reading the application. For example, although this application has only described certain operating systems which capable of handling multiple threads, it should be understood that other operating systems could be provided. A non-exhaustive list of operating systems includes Windows NT, Windows 2000, Java, UNIX, Linux or any other type system.

All such modifications are intended to be encompassed within the following claims, in which:

What is claimed is:

1. A computerized method of operating a programming language, comprising:

defining equivalence annotations within the programming language which indicate to a program development system of the programming language information about sequential execution of statements written within the programming language, wherein said statements must be executed in a multithreaded manner associated with said annotations; and developing the programming language as a sequential execution or as a substantially simultaneous execution based on contents of the equivalence annotations.

2. A computerized method of operating a programming language, comprising:

defining equivalence annotations wherein said equivalence annotations are pragmas within the programming language, which indicate to a program development system of the programming language, information about sequential execution of statements written within the programming language and associated with said equivalence annotations; and developing programs as a sequential execution or as a substantially simultaneous execution based on contents of the equivalence annotations.

3. A computerized method of operating a program language, comprising:

defining equivalence annotations within a programming language which indicate to a program development system of the programming language information about sequential execution of statements written within the programming language, wherein the equivalence annotations indicate that the statements are multithreadable and associated with said annotations; and developing programs as a sequential execution or as a substantially simultaneous execution, based on contents of the equivalence annotations, and synchronizing access of threads to shared memory using a specially defined synchronization;

synchronization counter;

wherein said synchronization counter is monotonically increasing, cannot be decreased, and prevents thread operation during its check operation.

4. A computerized method of operating a program language, comprising:

defining equivalence annotations within a programming language which indicate to a program development system of the programming language information about sequential execution of statements written within the programming language, wherein the equivalence annotations indicate that the statements are multithreadable and associated with said annotations;

developing programs as a sequential execution or as a substantially simultaneous execution, based on contents of the equivalence annotations; and synchronizing access of threads to shared memory using a specially defined synchronization;

wherein said synchronization flag is monotonically increasing, cannot be decreased, and prevents thread operation during its check operation.

5. A computerized method of operating a program language, comprising:

defining equivalence annotations wherein the equivalence annotations indicate that statements are multithreadable and associated with said annotations within a programming language which indicate to a program development system of the programming language information about sequential execution of said statements written within the programming language;

developing programs as a sequential execution or as a substantially simultaneous execution based on contents of the equivalence annotations; and synchronizing access of threads to shared memory using a specially defined synchronization;

wherein said synchronization counter includes a check operation which suspends a calling thread.

6. A method as in claim 5 further comprising maintaining a list of suspended threads.

* * * * *